US012155626B1

(12) United States Patent
Wei et al.

(10) Patent No.: US 12,155,626 B1
(45) Date of Patent: Nov. 26, 2024

(54) CLOUD-BASED EGRESS FILTERING SYSTEM

(71) Applicant: AVIATRIX SYSTEMS, INC., Santa Clara, CA (US)

(72) Inventors: Xiaobo Sherry Wei, Palo Alto, CA (US); Lee-Chik Cheung, Santa Clara, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 226 days.

(21) Appl. No.: 17/405,881

(22) Filed: Aug. 18, 2021

Related U.S. Application Data (60) Provisional application No. 63/229,919, filed on Aug. 5, 2021, provisional application No. 63/218,869, filed on Jul. 6, 2021, provisional application No. 63/150,503, filed on Feb. 17, 2021.

(51) Int. Cl.
*H04L 9/40* (2022.01)
*H04L 12/46* (2006.01)

(52) U.S. Cl.
CPC ...... *H04L 63/0263* (2013.01); *H04L 12/4641* (2013.01); *H04L 63/0227* (2013.01); *H04L 63/0272* (2013.01)

(58) Field of Classification Search
CPC ............ H04L 63/0263; H04L 12/4641; H04L 63/0227; H04L 63/0272
See application file for complete search history.

(56) References Cited

U.S. PATENT DOCUMENTS

| | | | |
|---|---|---|---|
| 7,764,692 B1 | 7/2010 | Bhatnagar et al. | |
| 10,652,281 B1* | 5/2020 | Moolenaar | H04L 63/0236 |
| 11,252,126 B1 | 2/2022 | Thunga et al. | |
| 2007/0079379 A1* | 4/2007 | Sprosts | H04L 63/145 726/24 |
| 2016/0014082 A1 | 1/2016 | Bharali et al. | |
| 2016/0359811 A1* | 12/2016 | Chan | H04L 63/0272 |
| 2018/0007002 A1* | 1/2018 | Landgraf | H04L 41/0893 |
| 2018/0159856 A1 | 6/2018 | Gujarathi | |
| 2019/0020666 A1 | 1/2019 | Leung et al. | |
| 2019/0238508 A1 | 8/2019 | Hira et al. | |
| 2020/0059492 A1 | 2/2020 | Janakiraman et al. | |
| 2020/0259793 A1 | 8/2020 | Pangeni et al. | |
| 2020/0280587 A1 | 9/2020 | Janakiraman et al. | |
| 2020/0287888 A1* | 9/2020 | Moore | H04L 63/0884 |
| 2020/0296139 A1* | 9/2020 | Fainberg | H04L 63/205 |
| 2020/0382345 A1 | 12/2020 | Zhao et al. | |

OTHER PUBLICATIONS

PCT/US2022/016111 filed Feb. 11, 2022, International Search Report and Written Opinion dated Jun. 3, 2022.
PCT/US2022/016201 filed Feb. 11, 2022 International Search Report and Written Opinion dated May 17, 2022.

\* cited by examiner

*Primary Examiner* — Cheng-Feng Huang
(74) *Attorney, Agent, or Firm* — Winstead PC (57) ABSTRACT

In one embodiment, a computing platform features a controller in communication with one or more virtual private cloud networks, including a first virtual private cloud network (VPC). The virtual private cloud network includes at least a first egress filtering gateway configured to filter egress traffic data received from a first gateway and route the filtered egress traffic data to a public network in accordance with a first set of filter rules. The first set of filter rules are included as part of a first security policy provided by the controller.

12 Claims, 8 Drawing Sheets

CLOUD-BASED EGRESS FILTERING SYSTEM

CROSS-REFERENCE TO RELATED APPLICATIONS

This application claims the benefit of priority on U.S. Provisional Patent Application No. 63/229,919 filed Aug. 5, 2021, Provisional Application No. 63/218,869, filed Jul. 6, 2021, and Provisional Application No. 63/150,503 filed Feb. 17, 2021, the entire contents of both of which are incorporated by reference herein.

FIELD

Embodiments of the disclosure relate to the field of networking. More specifically, one embodiment of the disclosure relates to a cloud-based filtering system implemented in a centralized or decentralized configuration for filtering outbound network traffic initiated from workloads in a virtual private cloud network.

GENERAL BACKGROUND

Over the past few years, cloud computing has provided an Infrastructure as a Service (IaaS), where resources are provided as part of a cloud computing platform (e.g., public cloud network) and made accessible to tenants as a service. One of these services allows tenants to run software instances residing within the cloud computing platform. This migration of software functionality into cloud computing platforms has led to greater usage of virtual networks for different public cloud providers, such as virtual private cloud networks referred to as virtual private clouds (VPCs) for AMAZON® Web Services (AWS) or GOOGLE® Cloud Services, virtual networks (VNETs) for MICROSOFT® AZURE® Cloud Services, or the like.

In general, a virtual private cloud network is an on-demand, configurable pool of shared resources, which are allocated within the cloud computing platform and provide a certain level of isolation between the different organizations or other entities (hereinafter, "users") using the cloud resources. Using the infrastructure of a public cloud network partially forming a multi-cloud computing platform, each virtual private cloud network may operate as a "spoke" virtual private cloud network (e.g., a first plurality of virtual network components that provide ingress/egress communications with cloud resources such as cloud-based software instances) or as a "transit" virtual private cloud network (e.g., a second plurality of virtual network components that support the routing of messages with the same or different public cloud networks).

Cloud-based software instances with unrestricted access to the Internet-based services are problematic as they expose the network to attack. Therefore, an important security measure for VPCs and VNETs is to effectively control outbound network traffic towards the Internet, namely messages transmitted over a network intended for subsequent transmission over a public network (hereinafter, "egress traffic"), by delineating legitimate requests from illegitimate requests. For example, legitimate requests may include access to software updates or providing a cloud instance access via Application Programming Interface (API) calls to other third-party or Software-as-a-Service (SaaS) services over the Internet. Illegitimate requests may include requests to exfiltrate certain types of data (e.g., passwords, financials, confidential company documents, etc.) to a malicious web server over the Internet. In fact, many compliance frameworks like the Payment Card Industry Data Security Standard (PCIDSS) and the Health Insurance Portability and Accountability Act (HIPAA) require egress security controls.

Conventionally, management of the VPCs and VNETs is highly complex for systems that utilize tens or hundreds of virtual private cloud networks. Also, it can be cost prohibitive to deploy next generation firewall solutions per VPC/VNET to solve these cloud-based management complexities.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Embodiments of a cloud-based egress filtering system, which may be implemented in accordance with a decentralized or centralized egress filtering deployment as described below, is configured to restrict egress (Internet-bound) traffic from virtual networking infrastructures. The cloud-based egress filtering system is centrally managed by a controller and executed by a software instance operating as an egress filtering gateway. Herein, the egress filtering gateway may feature one or more egress filtering components, such as Fully Qualified Domain Name (FQDN) filtering components. Based on the below-described deployments, the cloud-based egress filtering system delivers enterprise-class visibility, centralized control, and multi-cloud configurability not available from native cloud services or open source proxy software.

Herein, the cloud-based egress filtering system includes egress control filter being a software instance that, when executed, renders an interface for generating one or more security policies (sometimes referred to as "tags"). When operatively coupled to one or more egress filtering gateways installed as part of a virtual networking infrastructure, a security policy provides rules that, when executed by logic associated with the egress filtering gateway, monitor egress traffic in order to preclude the transmission of messages to unpermitted destinations by blocking and/or redirecting such messages.

In certain deployments (e.g., AWS deployment), the virtual networking infrastructure may be referred to as a virtual private cloud network (VPC), while in other deployments (Azure® deployment), the virtual networking infrastructure may be referred to as a virtual network (VNet). For ease and consistency, herein, we shall refer to all types of these virtual networking infrastructures as a "virtual private cloud network" or "VPC." The VPC can be deployed as part of a computing platform, where the computing platform may correspond to a single cloud computing platform or a multi-cloud computing platform supporting egress filtering over multiple public cloud networks.

According to one embodiment of the disclosure, the computing platform may feature one or more VPC clusters, where each VPC cluster includes (i) one or more cloud-based, virtual networking infrastructures each operating as a VPC (hereinafter, "spoke VPCs") that maintains cloud resources accessible by a set (i.e., one or more) of gateways, and/or (ii) one or more cloud-based virtual networking infrastructures operating as a VPC (hereinafter, "transit VPCs") that supports the routing of messages from/to the spoke VPCs or an on-premises network. Additionally, the computing platform features a shared services networking infrastructure, which may include a controller for updating policies that control operability of the gateways within the spoke VPCs and/or transit VPCs to maintain routing information and/or egress filter rules, as described below. Alternatively, the controller may be placed in another VPC separate from the shared services VPC.

More specifically, according to one embodiment of the disclosure, each spoke VPC includes a set of gateways (hereinafter, "spoke gateways"), which are communicatively coupled to one or more cloud software instances with a particular subnetwork (subnet) or particular subnets. Some or all of these cloud software instances may include executable applications. Additionally, each transit VPC may feature a set of gateways, which are configured to control the routing of messages between spoke VPCs, and in effect, control the routing of messages between cloud software instances deployed in different spoke VPCs. Besides being communicatively coupled to spoke gateways, the transit gateways may be communicatively coupled to one or more network edge devices (e.g., virtual or physical routers, etc.) deployed within an on-premises network (hereinafter, "on-prem network devices").

Figure 3:
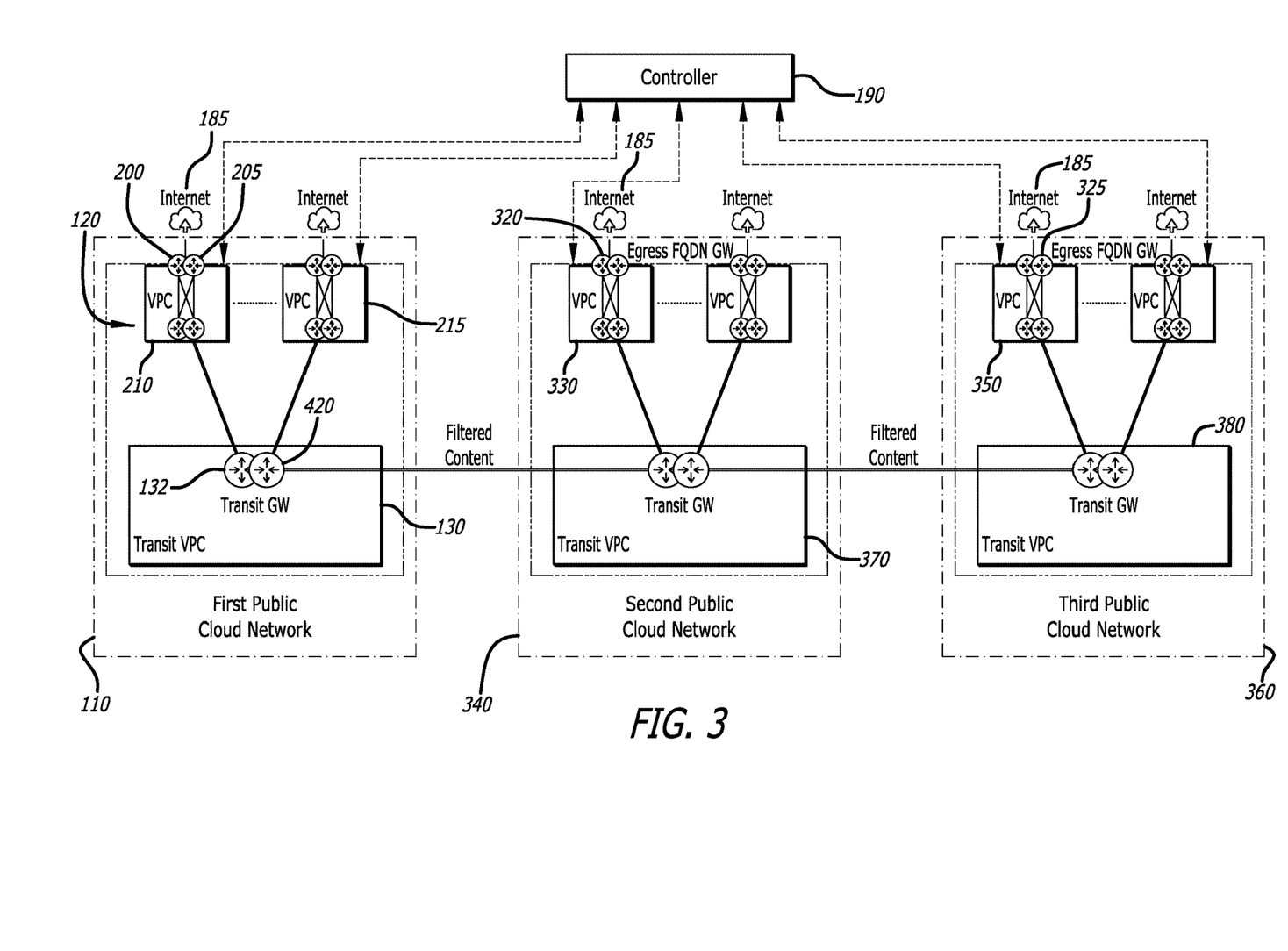
FIG. 3 is an exemplary embodiment of a multi-cloud computing platform implemented in accordance with a decentralized egress filtering deployment as shown of FIG. 2.
Figure 4:
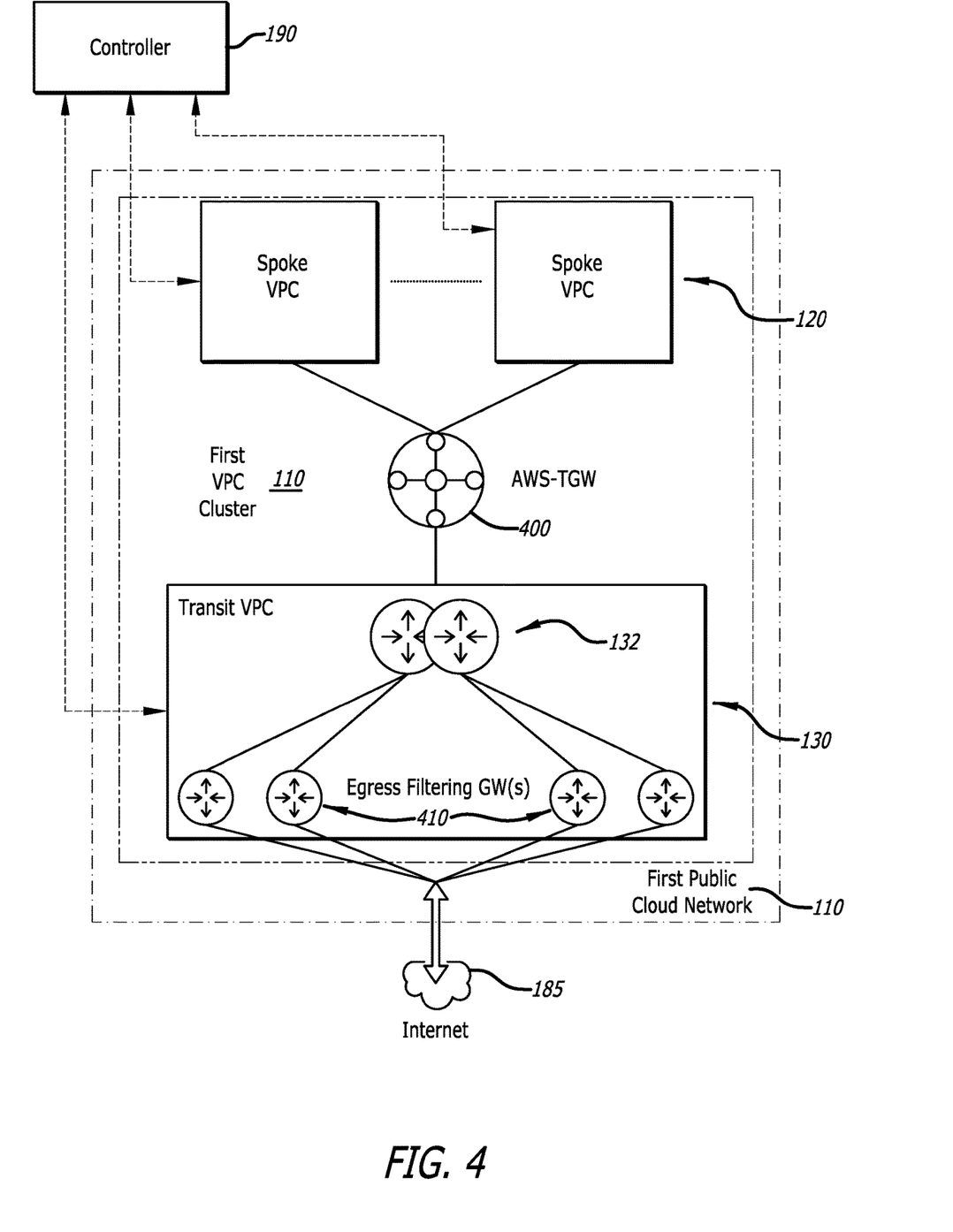
FIG. 4 is a second exemplary embodiment of the first VPC cluster of FIG. 1 implemented in accordance with a centralized egress filtering deployment.
Figure 5:
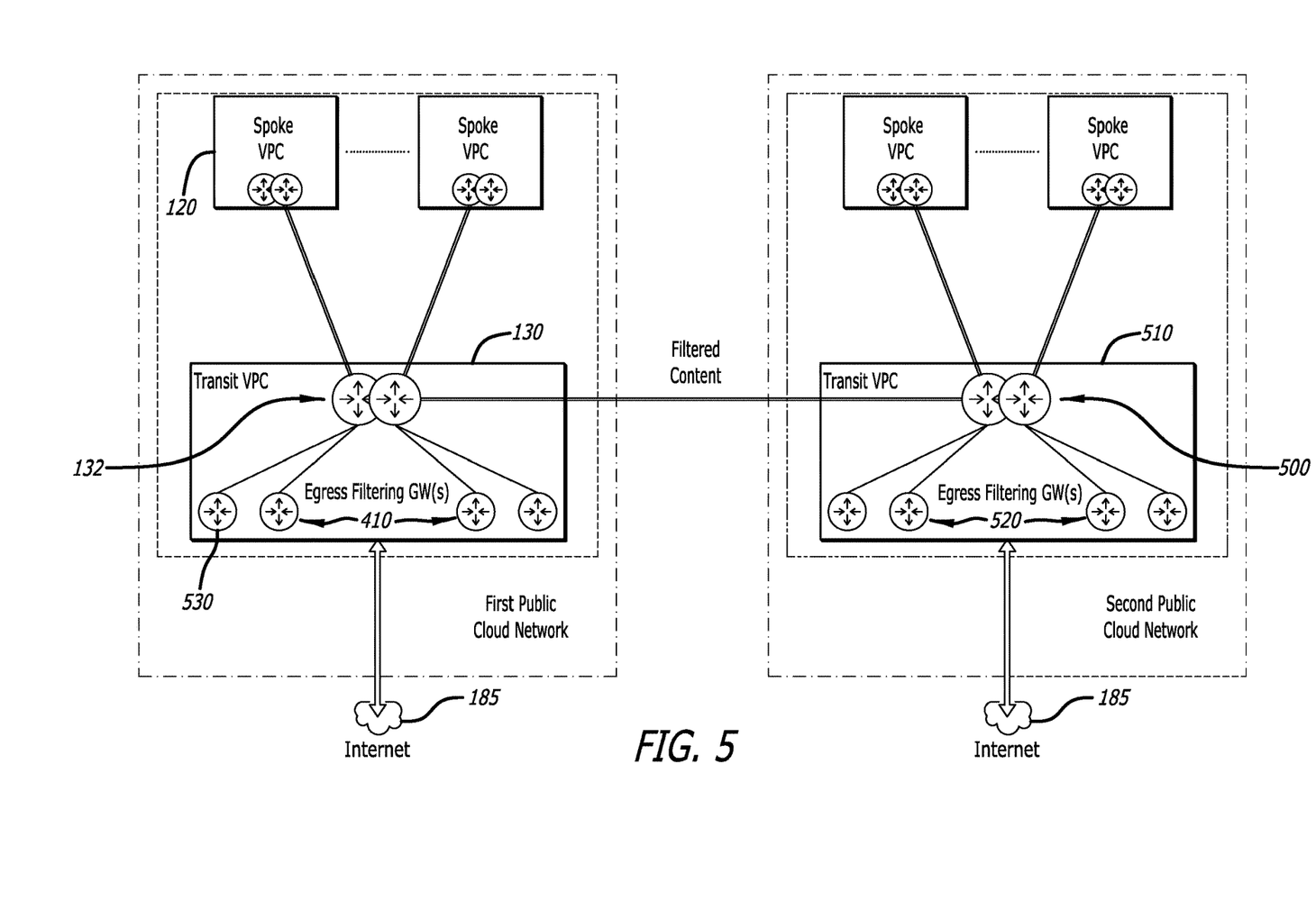
FIG. 5 is an exemplary embodiment of a multi-cloud computing platform implemented in accordance with a centralized egress filtering deployment as shown of FIG. 4.

Egress filtering gateways may be deployed to operate with (i) the spoke gateways and provide for decentralized (local) egress filtering (see FIGS. 2-3) or (ii) the transit gateways to provide for centralized egress filtering (see FIGS. 4-5). The egress filtering may be conducted in accordance with a selected FQDN filtering scheme, which provides filtering with respect to a number of transport protocols besides Hypertext Transfer Protocol (HTTP) and HTTP Secure (HTTPS), such as File Transfer Protocol (FTP), Secure File Transfer Protocol (SFTP), and/or Internet Control Message Protocol (ICMP) for example. According to one embodiment of the disclosure, the FQDN filtering scheme may be accomplished by configuring the egress filtering gateways with one or more security policies (tags). Each of the security policies may include one or more filter rules directed towards monitoring egress traffic for destination addresses that are not identified in the security policy (whitelist) or identified in the security policy (blacklist) and filtering the egress traffic data to preclude transmission over the Internet.

According to one embodiment of the disclosure, one or more security policies may be "attached" to an egress filtering gateway so that the filtering rule(s) included in the attached security policy, when enabled, are followed by the egress filtering gateway. Similarly, a security policy may be "detached" from the egress filtering gateway so that the filter rules associated with the detached security policy are no longer performed by the egress filtering gateway. The security policy can be enabled or disabled by a network administrator or any user configuring or reconfiguring an egress filtering gateway.

Herein, according to one embodiment of the disclosure, the security policy may include one or more user-configured filter rules that form a whitelist, where only the destination(s) specified in the whitelist are permitted to pass and drop all other destinations. However, in another embodiment of the disclosure, the security policy may include filter rules that form (i) a blacklist (i.e., only the destination(s) specified in a list are filtered and precluded from further transmission within the computing platform, and/or (iii) a combination of both a whitelist and a blacklist. Each destination identified in the whitelist or blacklist may be specified as a fully qualified domain name (FQDN), an Internet Protocol (IP) address, an IP address range, a specific Uniform Resource Locator (URL), wildcards denoting a related FQDNs and/or URLs, or the like.

It is contemplated that the egress filtering gateways may include a number of functional enhancements. For example, the egress filtering gateway may be configured with a subnet pass-through function, which allows for messages associated with one or more selected subnets in the VPC to bypass some of all of the filter rules forming the security policy. For example, one subnet may be utilized by developers (DEV subnet), and if identified as a subnet bypass, egress traffic from gateways associated with the DEV subnet are not subject to certain FQDN filtering. Another enhancement may include audit logging, which operates with logic associated with a central management console, to display analytics results including accepted and blocked filtering results, such as the top accepted FQDNs and the top precluded (blocked) FQDNs on a VPC or gateway granularity.

The controller may be configured to control operability of shared virtual networking infrastructures, and in particular, provide centralized policy management for updating and maintaining the (FQDN) filter rules and subnet bypass rules, as described below. Such updating and maintenance may be accomplished by tagging VPCs and assigning policies to those tags. Furthermore, the controller may be configured to handle insertion of spoke and/or transit gateways, the routing of traffic towards these gateways, as well as all the high availability mechanisms involved with these gateways. Lastly, the controller can enable a "Discovery" mode, namely a mode of operation where the controller accesses an audit log maintained by egress filtering gateways associated with a VPC to identify and aggregate attempted accesses to instances and/or hosts. These uncovered accesses can assist in formulating the security policies for the VPC or specific gateways within the VPC.

I. Terminology

In the following description, certain terminology is used to describe features of the invention. In certain situations, each of the terms "logic" and "component" is representative of hardware, software or a combination thereof, which is configured to perform one or more functions. As hardware, the logic (or component) may include circuitry having data processing or storage functionality. Examples of such circuitry may include, but are not limited or restricted to a processor (e.g., microprocessor, one or more processor cores, a programmable gate array, a microcontroller, an application specific integrated circuit, etc.), semiconductor memory, or combinatorial logic.

Alternatively, or in combination with the hardware circuitry described above, the logic (or component) may be software in the form of one or more software modules. The software module(s) may be configured to operate as a virtual hardware component (e.g., virtual processor) or a virtual network device including one or more virtual hardware components. The software module(s) may include, but are not limited or restricted to an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

Controller: The controller manages operability of a single-cloud or multi-cloud computing platform by leveraging centralized intelligence acquired based on access and knowledge of content within routing tables utilized by each gateway. The controller maintains security policies directed to egress filtering, which may be unique to each gateway and/or each VPC. The filter rules associated with each of these security policies are maintained to dynamically program both native cloud network constructs and gateways within a region of a public cloud network, within different regions of the public cloud network, or within different public cloud networks.

Gateway: This term may be construed as virtual or physical logic with data monitoring or data routing functionality. As an illustrative example, a first type of gateway may correspond to virtual logic, such as a data routing software component that is assigned an Internet Protocol (IP) address within an IP address range associated with a VPC including the gateway, to handle the routing of messages within and from the VPC. Herein, the first type of gateway may be identified differently based on its location/operability within a public cloud network, albeit the logical architecture is similar. For example, a "spoke" gateway is a gateway that supports routing between cloud software instances and "transit" gateways, where each transit gateways is configured to further assist in the propagation of data traffic (e.g., one or more messages) from one spoke gateway to another spoke gateway within the same spoke VPC or within different spoke VPCs.

A second type of gateway may correspond to virtual logic for supporting egress traffic filtering, based on security policies represented in a number of different formats (e.g., whitelist, blacklist, IP addresses, etc.), to limit VPC egress traffic to known domain names, known domain paths, or even related domain names/paths (e.g., use of wild cards such as the "*" symbol to identify all delimiters that occur before and/or after that symbol). The second gateway(s) in combination with the first type of gateways are deployed in the computing platform to control the ingress/egress of data traffic into/from a VPC.

Alternatively, in some embodiments, the gateway may correspond to physical logic, such as an electronic device that is communicatively coupled to the network and assigned the hardware (MAC) address and IP address.

IPSec tunnels: Secure peer-to-peer communication links established between gateways of neighboring virtual network components such as neighboring VPCs. The peer-to-peer communication links are secured through a secure network protocol suite referred to as "Internet Protocol Security" (IPSec).

Computerized: This term generally represents that any corresponding operations are conducted by hardware in combination with software.

Message: Information in a prescribed format and transmitted in accordance with a suitable delivery protocol. Hence, each message may be in the form of one or more packets, frames, or any other series of bits having the prescribed format.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General System Architecture

Figure 1:
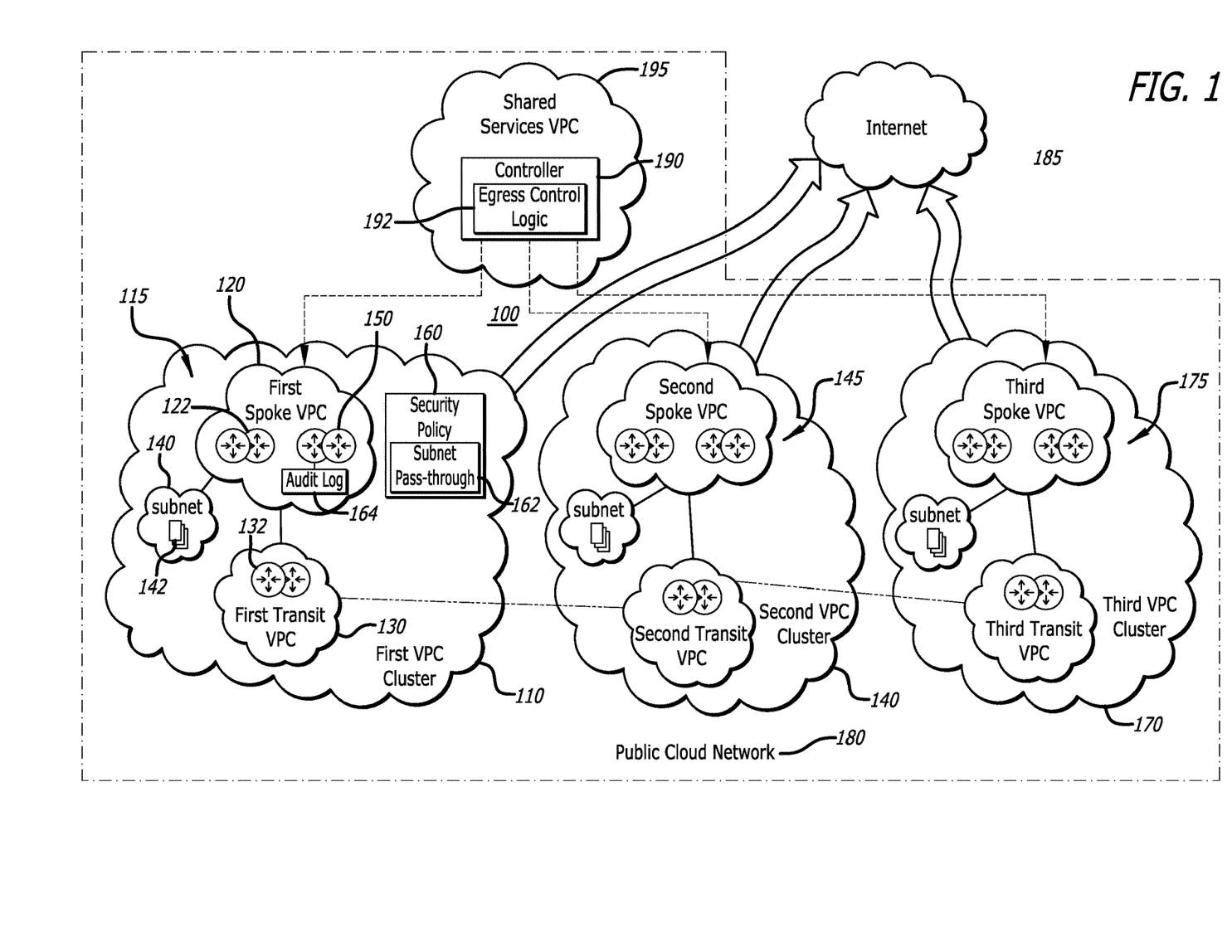
FIG. 1 is an exemplary embodiment of a computing platform implemented with filtering components within virtual private cloud network (VPC) clusters that restrict certain types of egress traffic.

Referring now to FIG. 1, an exemplary embodiment of a computing platform 100 is shown. The computing platform 100 is configured to provide connectivity between resources 115 of a first virtual private cloud network (VPC) cluster 110, resources 145 of a second VPC cluster 140, and resources 175 of a third VPC cluster 170 for example. Herein, according to one embodiment of the disclosure, the VPC clusters 110/140/170 may be deployed within the same public cloud network 180 (e.g., AMAZON® WEB SERVICES "AWS") as shown. Alternatively, it is contemplated that at least one the VPC clusters 110/140/170 may be deployed within a different public cloud network such as the first VPC cluster 110 may be deployed within the AWS cloud network, while the second VPC cluster 140 may be deployed within a GOOGLE® cloud network and the third public cloud network 170 may be deployed to a MICROSOFT® AZURE® cloud network.

According to one embodiment of the disclosure, the resources 115 of the first VPC cluster 110 may include one or more spoke VPCs, one or more transit VPCs, and one or more subnetworks (subnets) to maintain cloud software instances. More specifically, as shown, the spoke VPC(s) may feature at least a first spoke VPC 120. The first spoke VPC 120 is communicatively coupled to at least a first transit VPC 130, which includes a set of (transit) gateways 132. Similarly, the first spoke VPC 120 features a set of (spoke) gateways 122, each of which may be configured to be communicatively coupled to (i) one or more cloud software (application) instances 142 within a subnet 140 and (ii) the set of transit gateways 132 deployed as part of the first transit VPC 130.

Herein, according to one embodiment of the disclosure, each of the spoke VPCs, such as the first spoke VPC 120 for example, may be configured with one or more egress filtering gateways 150. These egress filtering gateway(s) 150 may be configured to perform domain name filtering such as FQDN filtering (hereinafter, "FQDN gateway(s) 150"). Herein, the operability of the FQDN gateways 150 is consistent with a security policy 160 provided by egress control logic 192 implemented within a controller 190. The controller 190 may be located in a designated VPC or a shared services VPC 195 as shown. Herein, the security policy 160 may operate as a whitelist that identifies to which domains each of the spoke gateways 122 is permitted to access via the Internet 185 in accordance with restrictions imposed on egress traffic by the FQDN gateways 150. This identification may be directed to specific domain names (FQDN whitelist and/or blacklist), a range of domain names through the use of a wildcard parameter (e.g., "*" to capture known/related domain names and/or domain paths), specific IP addresses, and/or IP address ranges.

As shown in FIG. 1, the FQDN gateway(s) 150 conduct egress filtering within the first transit VPC 130 in a decentralized scheme. Although not shown, according to another embodiment of the disclosure, at least one of the transit VPCs, such as the first transit VPC 130 for example, may be configured with the FQDN gateway(s) 150. For this implementation, egress filtering would be conducted in a centralized scheme. Regardless of the deployment scheme, the FQDN gateways 150 may be configured to filter egress traffic prior to transmission from the first VPC cluster 110. This filtering allows for restriction of content within egress traffic to ensure compliance with industrial, regional or governmental regulations (e.g., PCI, HIPPA, etc.).

It is contemplated that the secure policy 160 may include one or more subnet pass-through rules 162, which allow for content sourced by or destined to one or more identified subnet(s) pertaining to that public cloud network to bypass the FQDN filtering rules set forth in the security policy 160. For example, with respect to the first VPC cluster 110, egress traffic data from gateways associated with a developer (DEV) subnet, when identified as a subnet pass-through, is not subject to FQDN filtering unlike egress traffic data from a product-marketing (PROD) subnet. In contrast, with respect to the third VPC cluster 170, the egress traffic data from gateways associated with PROD subnet, when identified as a subnet pass-through, is not subject to FQDN filtering unlike egress traffic data from the DEV subnet. The controller 190 within the shared services VPC 195 is responsible for creating, updating and maintaining the security policies 160 including the subnet pass-through rules 162.

It is further contemplated that the security policy 160 is configured to signal logic within the FQDN gateways 150 deployed with a particular VPC (e.g., spoke VPC or transit VPC) to maintain an audit log 164. The audit log 164 constitutes an aggregate of egress traffic, namely message transmissions and/or attempted message transmissions, from the first VPC cluster 110, from each VPC (spoke, transit) 120/130, and/or from each FQDN gateway 150 within the VPC cluster 110. The analytics results associated with the egress traffic are maintained, such as the top accepted FQDNs and the top blocked FQDNs.

It is further contemplated that each of the gateways may be placed into Discovery mode, namely an operating mode in which that gateway will commence to collect accessed FQDN data. For example, with respect to a decentralized filtering deployment of the FQDN gateways 150 as shown, a spoke gateway 122 may be placed into Discovery mode to collect every FQDN to which the spoke gateway 122 is accessing or attempting to access. Similarly, for a centralized filtering deployment, a transit gateway 132 may be placed into Discovery mode to commence collection of every FQDN to which the transit gateway 132 is accessing or attempting to access.

III. Decentralized Egress Filtering Service

Figure 2:
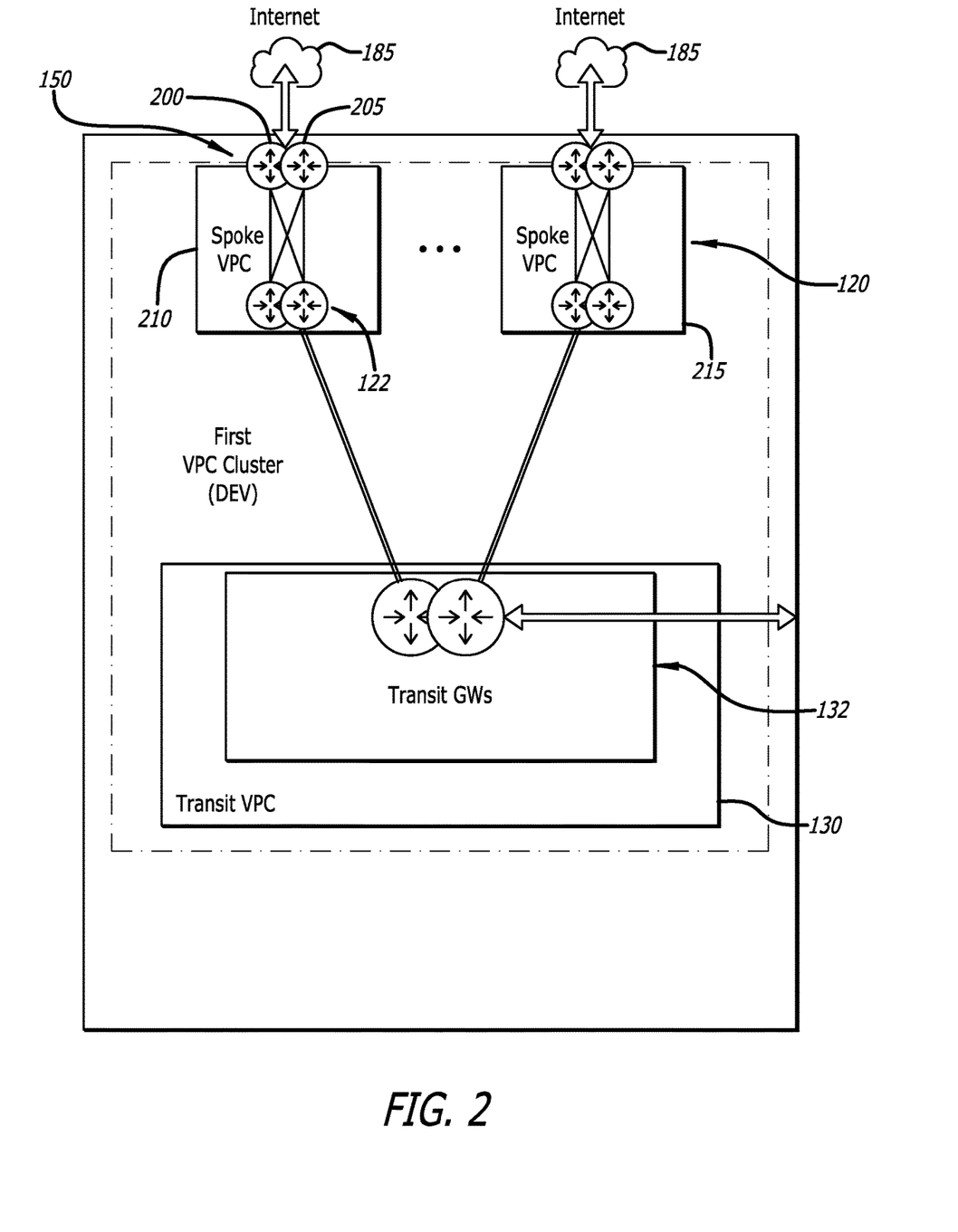
FIG. 2 is a first exemplary embodiment of a first VPC cluster of FIG. 1 implemented in accordance with a decentralized egress filtering deployment.

Referring now to FIG. 2, first exemplary embodiment of the first VPC cluster 110 of FIG. 1 implemented in accordance with a decentralized egress filtering deployment is shown. Herein, a set of egress filtering gateways 200/205 (e.g., FQDN gateways 150) is deployed in one or more of the spoke VPCs 120 of FIG. 1 (e.g., spoke VPC 210). As shown, each of the first set of egress filtering gateways 200/205 is responsible for conducting egress filtering prior to transmission from the spoke VPC 210 to the Internet 185 or to the set of transit gateways 132 deployed in the transit VPC 130. Herein, filtering is handled by the egress filtering gateways 200/205 while the transit gateways (GW) 132 support communications between different spoke VPCs 210 and 215, which may reside within the same region or different regions of the same public cloud network or within different public cloud networks.

Herein, the combination the spoke gateways 122 and the egress filtering gateways 200/205 in communication with the transit VPC 130 forms the basic building block for single cloud as well as multi-cloud transit as shown in FIG. 3. Herein, managed by the controller 190, egress filtering gateways 200/205 associated with the spoke VPC 210 for the first public cloud network 300 imposes filter criteria on egress traffic data directed to the Internet 185. Similarly, both egress filtering gateways 320 associated with a second spoke VPC 330 for the second public cloud network 340 and egress filtering gateways 325 associated with a third spoke VPC 350 for a third public cloud network 360 impose filter criteria on egress traffic directed to the Internet 185. Communications between these spoke VPCs 210/330/350 via transit VPCs 130/370/380 allow for different filtering restrictions to be programmed for different VPCs along with visibility and control to guide communications to different VPCs depending on filter rules (e.g., an administrator can direct guests and lower level employees to more restrictive FQDN filter rules while higher level employees may be directed to another public cloud network with less restrictive FQDN filter rules.

IV. Centralized Egress Filtering Service

Referring now to FIG. 4, a second exemplary embodiment of the first VPC cluster 110 of FIG. 1 implemented in accordance with a centralized egress filtering deployment is shown. This centralized egress filtering deployment is applicable to (i) organizations that are already using AWS Transit Gateway 400 and due to internal policies or strategy are not willing or able to migrate to transit VPC-based design or (ii) organizations that utilize only a single public cloud network such as AWS cloud network for example. This logical architecture cannot be repeated across multiple clouds due to its dependency on the native AWS Transit Gateway service, but can be repeated across multiple, different regions of the AWS public cloud network through coupled transit VPCs associated with these different regions.

Herein, the controller 190 provides centralized deployment, management and control for AWS Transit Gateway 400 and connected VPCs (e.g., spoke VPCs 120, transit VPCs 130). All necessary routes and security policies in the VPCs 120/130, AWS Transit Gateway 400, and/or egress filtering gateways 410 are automatically programmed, managed and controlled by the controller 190. Each of the transit gateways 132 is a multi-purpose service node that can perform various functionality such as high-availability and load balancing for the egress filtering gateways (GW(s)) 410 located within the transit VPC 130. This deployment also provides both scale-up and scale-out functionality, depending on throughput requirements. Organizations can increase the number of cloud software instances utilized or increase the number of egress filtering gateways directly from the controller.

Referring to FIG. 5, an exemplary embodiment of a multi-cloud computing platform implemented in accordance with a centralized egress filtering deployment of FIG. 4 is shown. Herein, some of all of the transit gateways 132 and 500 of transit VPCs 130 and 510 are configured to be in communication with one or more egress filtering transit gateways 410 and 520. The egress filtering transit gateways 410/520 may correspond to FQDN gateway instances. In particular, the egress filtering transit gateways 410/520 are configured to perform FQDN filtering on egress traffic, notably messages transmitted to the Internet 185.

As an illustrative example, the transit VPC 130 includes the transit gateways 132, each of which is adapted to receive egress traffic from a spoke VPC (e.g., spoke VPC 120). Upon receipt of the Internet-bound traffic, the transit gateway 132 performs a hash operation on the egress traffic data to produce a hash value. The hash value may be used in the selection of at least one of the egress filtering transit gateways 410 in accordance with a selected load balancing scheme for filtering the egress traffic data. For instance, according to one embodiment of the disclosure, the hash value may be used to generate a selection value that is derived from one or more bit values found within a prescribed portion of the hash value (e.g., a prescribed number of bits such as a nibble, byte, word, or the like) to identify a selected gateway 530 of the egress filtering transit gateways 410. Alternatively, the selection value may be derived from the result of a modulo operation on the hash value or derived from logical operations performed on the hash value.

This deployment provides both scale-up and scale-out functionality, depending on throughput requirements. Organizations can increase the number of cloud software instances utilized or increase the number of egress filtering gateways directly from the controller 190.

V. Visualization for the Egress Filtering Service

Figure 6A:
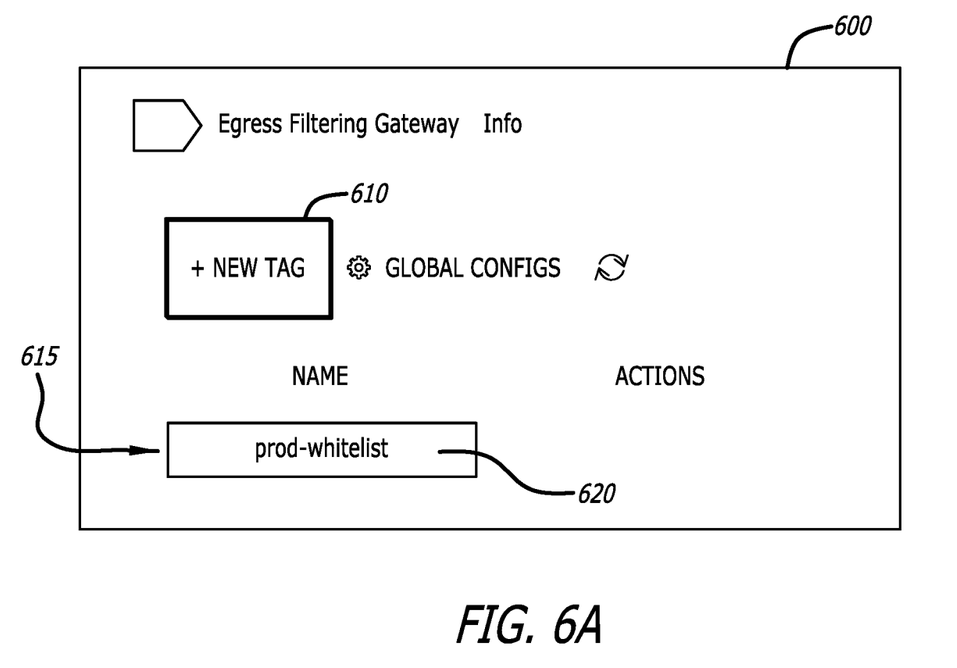
FIG. 6A is an exemplary embodiment of a first graphic user interface rendered by the egress control filter deployed within the controller of FIG. 1.

Referring now to FIG. 6A, an exemplary embodiment of a first graphic user interface 600 rendered by the egress control filter 192 deployed within the controller 190 of FIG. 1 is shown. According to one embodiment of the disclosure, the egress control filter 192 includes a software instance that, when executed, renders the first interface 600 for generating a security policy (tag). To generate the tag, a user may select the "+New" display element 610, and thereafter, an entry 615 associated with the tag is available for user input. Thereafter, the user can enter a selected name 620 for the tag such "prod-whitelist" for example. Hence, the "prod-whitelist" tag is created.

Figure 6B:
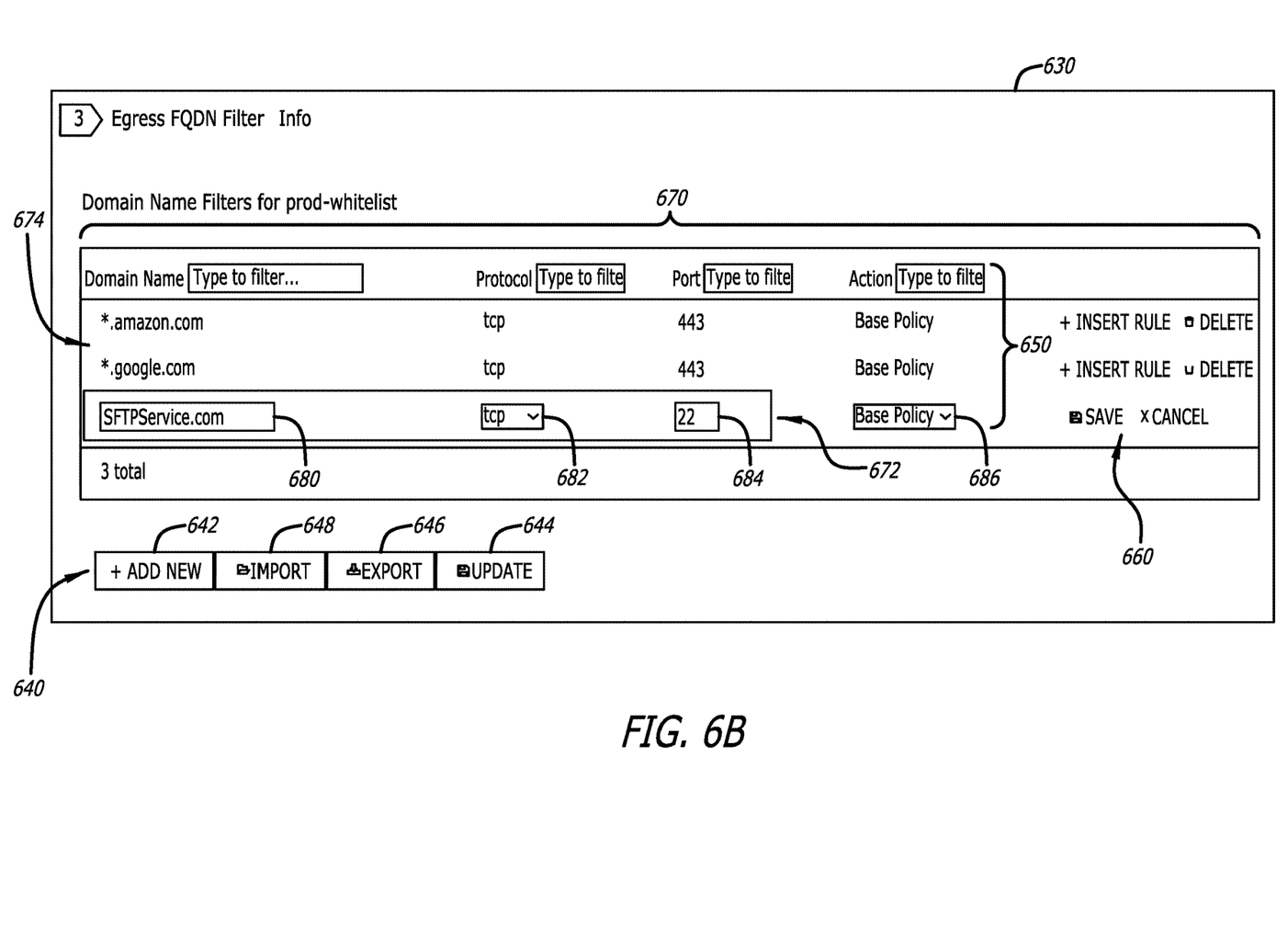
FIG. 6B is an exemplary embodiment of a second graphic user interface rendered by the egress control filter deployed within the controller of FIG. 1.

Referring to FIG. 6B, an exemplary embodiment of a second graphic user interface 630 rendered by the egress control filter 192 deployed within the controller 190 of FIG. 1 is shown. Herein, the second interface 630 includes (i) a first set of display elements 640 that may be used to generate the "prod-whitelist" tag 650 and (i) a second set of display elements 660 that may be used to save or delete egress filtering rules 670 associated with the tag 650. The generation of the tag 650 may involve the addition of the egress filtering rules 670 as shown.

Herein, as illustrated in FIG. 6B, to generate or augment the egress filtering rules 670 forming the tag 650, a user may select the "+New" display element 642, and thereafter, an entry 672 is created. Thereafter, the user can enter a filtered destination 680, where a domain name (FQDN) or IP address may be entered. For efficiency, a wild card "*" is allowed for HTTP/HTTPS (TCP 443), as shown in egress filtering rule 674. The entry 672 further allows for programmability of the protocol type 682 and port number 684 to allow for permitted access to the domain name through only specific transport protocols and/or ports. Also, the action type 686 is used to identify if the "prod-whitelist" tag 650 is associated with a white list (base policy) or part of a black list (deny policy menu option).

As further shown in FIG. 6B, the "Update" display element 644 is configured to save the egress filtering rules 670 in the tag 650 and if gateways are attached to the tag 650, selection of the "Update" display element 644 applies the rules 670 to the gateways. Furthermore, the "Export" display element 646 allows for the downloading of configured egress filtering rules on a per tag basis into a separate document such as a text-file format while the "Import" display element 648 allows for the uploading of external egress filtering rules on a specific tag. The external egress filtering rules may be provided as part of a downloadable file generated from audit logs after placement of the gateway into Discovery mode, a file export from a different tag, or a text file.

Figure 7:
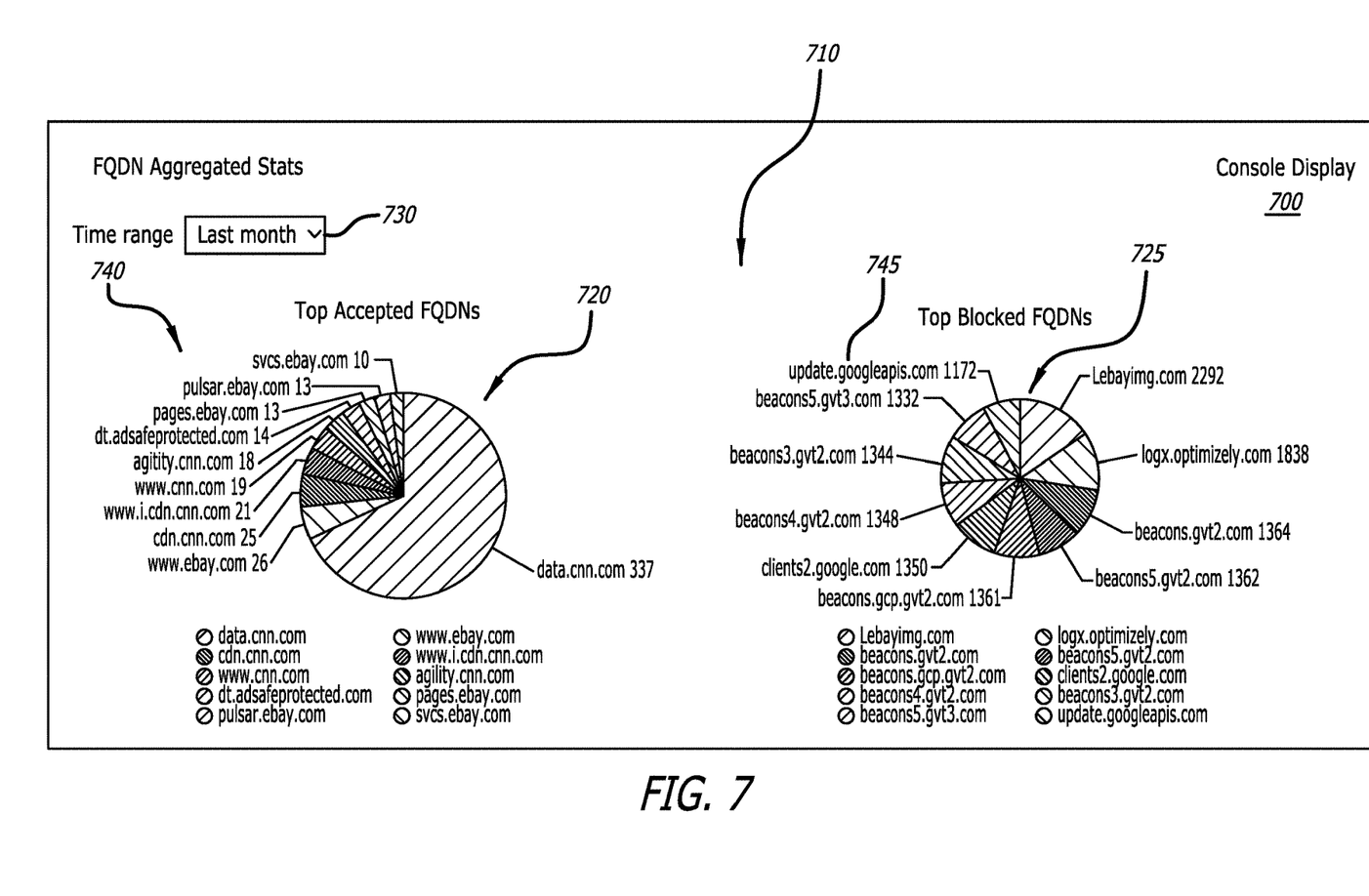
FIG. 7 is an exemplary embodiment of a centralized management console to render data analytics associated with the operations of the egress filtering components.

Referring to FIG. 7, an exemplary embodiment of a centralized management console 700 to render data analytics associated with the operations of the egress filtering components is shown. After FQDN filtering is deployed and in operation, the controller will start to gather all the analytic results for display. Thus, upon selection of a displayable element, the aggregate analytic results 710 as well as the gateway-based analytic results (not shown) are rendered. The aggregate analytic results 710 correspond to the analytic results from all the gateways associated with a particular VPC (or multiple VPCs) combined and presented as a holistic representation such as one or more pie charts 720/725. In contrast, the gateway analytic results provide a viewpoint of the egress filtering analytic results on a per gateway basis that is useful for updating egress filtering rules based on these analytic results.

As further shown in FIG. 7, the analytic results may be represented in a first pie chart 720 that illustrate the highest frequency of FQDNs that are being accepted and a second pie chart 725 that illustrates the highest frequency of FQDNs that are being precluded from transit (e.g., block, re-routed, etc.). The same analytic results may be provided on an individual gateway basis. A time range display element 730, such as drop down menu for example, allows for selection of a time range that can go back to a described date range, last year, a certain calendar quarter, the last month, last week, or just from whatever happens today.

For more detailed analytic results, the management console 700 illustrates the accepted FQDNs 740 and/or blocked FQDNs 745 as links that, when selected, provide the user with more information pertaining to the FQDN (e.g., ownership, server location, etc.). Also, the management console 700 may be configured to provide additional search functions to allow for specific analytic results pertaining to a specific FQDN, a specific source IP address, a start time and the end time, or the like.

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. A computing platform, comprising:
    a controller deployed within a cloud computing platform and maintained within a non-transitory storage medium;
    a first virtual private cloud network communicatively coupled to the controller, the first virtual private cloud network includes at least a first egress filtering gateway configured to:
        filter egress traffic data received from a first gateway; and
        route filtered egress traffic data to a public network in accordance with a first set of filter rules included as part of a first security policy provided by the controller,
    wherein the controller is configured to enable a discovery mode of operation to access an audit log maintained by the first egress filtering gateway, the audit log comprising information associated with the egress traffic data that has been accepted or precluded from transmission.

2. The computing platform of claim 1 further comprising a first subnetwork included within the first virtual private cloud network, the first subnetwork comprises one or more cloud software instances being a source of the traffic data filtered by the first egress filtering gateway.

3. The computing platform of claim 2, wherein the first virtual private cloud network corresponds to a spoke virtual private cloud network and the first gateway corresponds a first spoke gateway interposed to communicate with the one or more cloud instances and a plurality of egress filtering gateways including the first egress filtering gateway.

4. The computing platform of claim 1 further comprising:
    a second virtual private cloud network communicatively coupled to the controller, the second virtual private cloud network includes at least a second egress filtering gateway configured to filter messages routed from a second gateway in accordance with a second set of filter rules included as part of a second security policy provided by the controller,
    wherein the second set of filter rules being different from the first set of filter rules.

5. The computing platform of claim 4, operating as a multi-cloud computing platform, wherein the first virtual private cloud network being deployed within a first public cloud network and the second virtual private cloud network being deployed within a second public cloud network that is different from the first public cloud network.

6. The computing platform of claim 1, wherein the first virtual private cloud network corresponds to a transit virtual private cloud network and the first gateway corresponds a first transit gateway communicatively coupled to a plurality of egress filtering gateways including the first egress filtering gateway.

7. The computing platform of claim 1, wherein the controller is configured to conduct analytics on the information associated with the egress traffic data to generate analytic results for subsequent display by a management console.

8. The computing platform of claim 1, wherein the egress filtering gateway corresponds to logic conducting Fully Qualified Domain Name (FQDN) filtering.

9. A non-transitory storage medium including one or more egress filtering gateways being software that, upon execution and operability controlled by a controller, performs operations, comprising:
    receiving, by a first egress filtering gateway of the one or more egress filtering gateways, a first security policy including a first set of filter rules;
    receiving, by the first egress filtering gateway, egress traffic data for routing over a public network;
    conducting, by the first egress filtering gateway, Fully Qualified Domain Name (FQDN) filtering of the egress traffic data in accordance with the first set of filter rules of the first security policy provided by the controller, the egress traffic data being received from a first gateway for routing to the public network; and
    enabling, by the controller, a discovery mode of operation to access an audit log maintained by the first egress filtering gateway, the audit log comprising information associated with the egress traffic data that has been accepted or precluded from transmission.

10. The non-transitory storage medium of claim 9, wherein the received egress traffic data originating from a first subnetwork included within a first virtual private cloud network that includes the one or more egress filtering gateways, the first subnetwork comprises one or more cloud software instances being a source of the traffic data filtered by the first egress filtering gateway.

11. The non-transitory storage medium of claim 9, further comprising;
    collecting information associated with the egress traffic data with an audit log associated with the first egress filtering gateway, the information identifying messages associated with a first set of egress traffic data with acceptable FQDNs and messages associated with a second set of egress traffic data with FQDNs precluded from transmission.

12. The non-transitory storage medium of claim 11 further comprising:
    conducting analytics on the information associated with the egress traffic data to generate analytic results for subsequent display by a management console.

* * * * *